US008821209B2

(12) United States Patent
Fong et al.

(10) Patent No.: US 8,821,209 B2
(45) Date of Patent: Sep. 2, 2014

(54) INTERACTIVE DEVICE WITH SOUND-BASED ACTION SYNCHRONIZATION

(75) Inventors: Peter Sui Lun Fong, Monterey Park, CA (US); Xi-Song Zhu, Dongguan (CN); Kelvin Yat-Kit Fong, Monterey Park, CA (US)

(73) Assignee: Peter Sui Lun Fong, Monterey Park, CA (US)

(*) Notice: Subject to any disclaimer, the term of this patent is extended or adjusted under 35 U.S.C. 154(b) by 649 days.

(21) Appl. No.: 12/771,662

(22) Filed: Apr. 30, 2010

(65) Prior Publication Data

US 2011/0034102 A1 Feb. 10, 2011

Related U.S. Application Data

(63) Continuation-in-part of application No. 12/536,690, filed on Aug. 6, 2009, now Pat. No. 8,715,031.

(51) Int. Cl.
*A63H 3/28* (2006.01)
(52) U.S. Cl.
CPC .......... *A63H 3/28* (2013.01); *A63F 2300/6045* (2013.01); *A63F 2300/8094* (2013.01); *A63F 2300/6607* (2013.01); *A63H 2200/00* (2013.01); *A63F 2300/1062* (2013.01); *A63F 2300/6072* (2013.01)
USPC ............ 446/175; 446/184; 446/242; 446/397
(58) Field of Classification Search
USPC ....................................................... 446/175
See application file for complete search history.

(56) References Cited

U.S. PATENT DOCUMENTS

| 4,245,430 | A | | 1/1981 | Hoyt |
| 4,272,915 | A | | 6/1981 | Noble |
| 4,717,364 | A | | 1/1988 | Furukawa |
| 4,840,602 | A | | 6/1989 | Rose |
| 4,949,327 | A | | 8/1990 | Forsse et al. |
| 5,145,447 | A | * | 9/1992 | Goldfarb ........................ 446/408 |
| 5,587,545 | A | * | 12/1996 | Nakada et al. .................. 84/600 |
| 6,175,070 | B1 | * | 1/2001 | Naples et al. ................... 84/609 |
| 6,312,307 | B1 | * | 11/2001 | Dean, II ......................... 446/297 |
| 6,514,117 | B1 | | 2/2003 | Hampton |
| 6,682,392 | B2 | | 1/2004 | Chan |
| 7,064,261 | B2 | * | 6/2006 | Shao ........................... 84/477 R |
| 7,120,257 | B2 | | 10/2006 | Mahoney |
| 2002/0098879 | A1 | * | 7/2002 | Rheey ............................. 463/1 |
| 2004/0186708 | A1 | * | 9/2004 | Stewart ......................... 704/207 |

(Continued)

OTHER PUBLICATIONS

Elan Microelectronics Corp., "User's Manual" Doc. Version 1.3, Nov. 2007.

(Continued)

*Primary Examiner* — Tramar Harper
(74) *Attorney, Agent, or Firm* — Stetina Brunda Garred & Brucker

(57) ABSTRACT

An interactive amusement device and a method therefor are disclosed. The device plays a musical soundtrack in a first game iteration. A sequence of user input actions received during this learning mode is detected, and an output signal is generated in response. Timestamps for each of the user input actions is stored into memory. Additionally, the output signal is generated on at least one interval of the user input actions based on the stored timestamps, and is coordinated with the play back of a second musical soundtrack during a second game iteration.

17 Claims, 16 Drawing Sheets

(56) References Cited

U.S. PATENT DOCUMENTS

2007/0022139 A1* 1/2007 Stewart .................... 707/104.1
2008/0026669 A1* 1/2008 Rehkemper et al. .......... 446/301
2009/0258700 A1* 10/2009 Bright et al. .................. 463/31

OTHER PUBLICATIONS

Macronix International Co., Ltd. "MXIC" Oct. 13, 2005.
Elan Microelectronics Corp., "Reference Guide" Doc. Version 1.3, Nov. 2007.

* cited by examiner

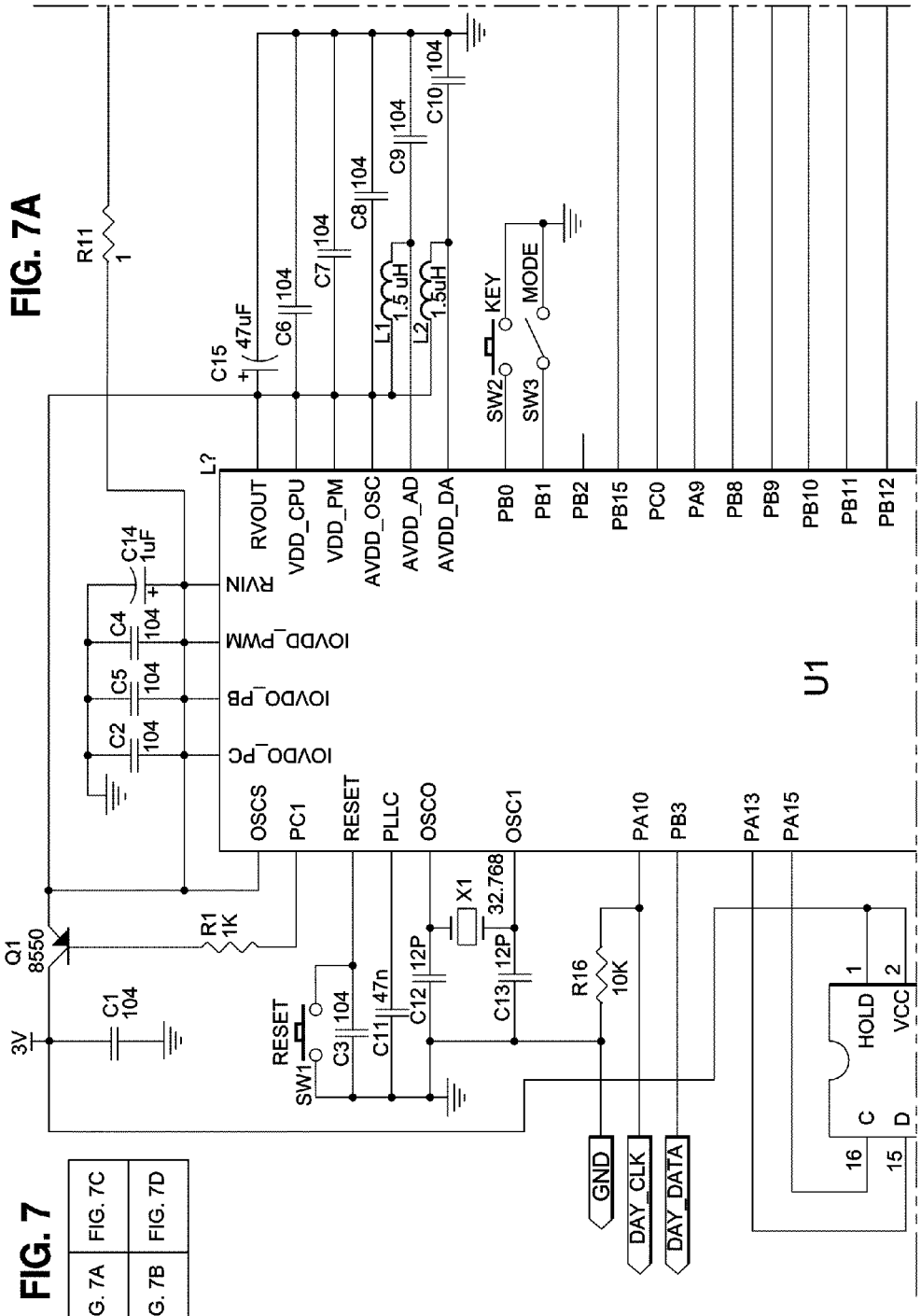

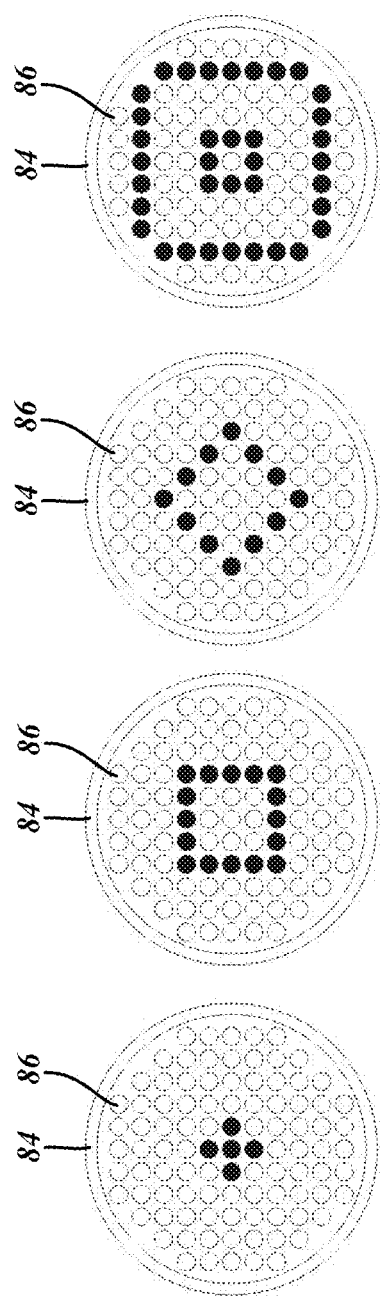

INTERACTIVE DEVICE WITH SOUND-BASED ACTION SYNCHRONIZATION

CROSS-REFERENCE TO RELATED APPLICATIONS

This application is a continuation-in-part of U.S. patent application Ser. No. 12/536,690, filed Aug. 6, 2009 now U.S. Pat. No. 8,715,031 entitled "INTERACTIVE DEVICE WITH SOUND-BASED ACTION SYNCHRONIZATION," the entirety of the disclosure of which is incorporated by reference herein.

STATEMENT RE: FEDERALLY SPONSORED RESEARCH/DEVELOPMENT

Not Applicable

BACKGROUND

1. Technical Field

The present invention relates generally to toys and amusement devices, and more particularly, to an interactive toy with sound-based action synchronization.

2. Related Art

Children are often attracted to interactive amusement devices that provide both visual and aural stimulation. In recognizing this attraction, a wide variety have been developed throughout recent history, beginning with the earliest "talking dolls" that produced simple phrasings with string-activated wood and paper bellows, or crying sounds with weight activated cylindrical bellows having holes along its side. These talking dolls were typically limited to crying "mama" or "papa."

Further advancements utilized wax cylinder phonograph recordings that were activated with manually wound clockwork-like mechanisms. Various phrases were recorded on the phonographs for playback through the dolls to simulate dialogue. Still popular among collectors today, one historically significant embodiment of a talking doll is the "Bebe Phonographe" made by the Jumeau Company in the late 19th century. In addition to spoken words, music was also recorded on the phonograph so that the doll could sing songs and nursery rhymes.

Thereafter, dolls having an increased repertoire of ten to twenty spoken phrases were developed. The speaking function was activated with a pull of a string that activated a miniature phonograph disk containing the pre-recorded phrases. The "Chatty Cathy" talking doll includes such a pull string-activated mechanism.

In addition to the aforementioned speaking capabilities, there have been efforts to make a doll more lifelike with movable limbs and facial features. Further, the movement of such features was synchronized with the audio output. For example, when a phrase was uttered, the jaws of the doll could be correspondingly moved. The instructions required for such synchronized animation of the features of the doll were stored in a cassette recording with the control signals and the audio signal.

One deficiency with these earlier talking dolls was the rather low degree of interactivity between the doll and the child, as the input to trigger speaking and movement was limited to decidedly mechanical modalities such as pulling a string, turning a crank, or pushing a button. Further improvements involved dolls with basic sensors such as piezoelectric buzzers that, when triggered, cause the doll to respond immediately by outputting a sound or movement. Examples of such devices include the "Interactive Sing & Chat BRUIN™ Bear" from Toys 'R' Us, Inc. of Wayne, N.J. With substantial improvements in digital data processing and storage, however, dolls having greater interactivity became possible. Instead of mechanical activation, the child provided a voice command to the doll. The received audio signal was processed by a voice recognition engine to evaluate what command was issued. Based upon the evaluated command, a response was generated from a vocabulary of words and phrases stored in memory. A central processor controlled a speech synthesizer that vocalized the selected response. In conjunction with the vocalized speech, an accompanying musical soundtrack could be generated by an instrument synthesizer. The central processor could also control various motors that were coupled to the features of the doll in order to simulate life-like actions.

These animated toys typically portrayed popular characters that appeared in other entertainment modalities such as television shows and movies, and accordingly appeared and sounded alike. Some commercially available toys with these interactive features include Furby® from Hasbro, Inc. of Pawtucket, R.I. and Barney® from HiT Entertainment Limited of London, United Kingdom.

Despite the substantially increased interactivity with these dolls, there remain a number of deficiencies. Some parents and child psychologists argue that these dolls do nothing to stimulate a child's imagination because they are reduced to reacting passively to a toy, much like watching television. Notwithstanding the increased vocabulary, the limited number of acceptable commands and responses has proven interaction to be repetitious at best. Although children may initially be fascinated, they soon become cognizant of the repetition as the thrill wears off, and thus quickly lose interest. Accordingly, there is a need in the art for an improved amusement device. Furthermore, there is a need for interactive toys with sound-based action synchronization.

BRIEF SUMMARY

A method for interactive amusement is contemplated in one embodiment of the present invention. The method may begin with playing a first musical soundtrack in a first game iteration. The method may then include detecting a sequence of user input actions received during the first game iteration. Furthermore, there may be a step of generating an output audio signal in response to the detection of one of the sequence of user input actions. The method may include storing into memory timestamps of each of the detected sequence of user input actions. The timestamps may be synchronized to the first musical soundtrack. The method may also include generating the output audio signal on at least one interval of the received sequence of user input actions based upon the recorded timestamps. The output audio signal may be coordinated with the playing of a second musical soundtrack during a second game iteration.

In accordance with another embodiment of the present invention, an animated figure amusement device with at least one movable feature is contemplated. The device may include a first acoustic transducer that is receptive to a sequence of sound signals in a first iteration of playing a first soundtrack. The sequence may correspond to a pattern of user input actions associated with the soundtrack. Additionally, the device may include a mechanical actuator having an actuation element coupled to the movable feature of the animated figure. The device may also include a programmable data processor that has a first input connected to the acoustic transducer and a first output connected to the mechanical actuator. The mechanical actuator may be activated by the programmable data processor in synchronization with the received sequence of sound signals.

In yet another embodiment, there is provided a method for interactive amusement. The method may include playing a first musical soundtrack. This may be followed by a step of detecting a sequence of user input actions during the playing of the first musical soundtrack. Then, the method may include storing into memory timestamps of each of the detected sequence of user input actions. The timestamps may be synchronized to the first musical soundtrack. The method may further include generating an output on at least one interval of the received sequence of user input actions. The output may be selected from a group consisting of an audio signal, an visual animation sequence, and a mechanical actuator activation.

The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which:

FIGS. 9A-9D are illustrations of an animation sequence generated on the on-board display device.

Common reference numerals are used throughout the drawings and the detailed description to indicate the same elements.

DETAILED DESCRIPTION

The detailed description set forth below in connection with the appended drawings is intended as a description of the presently preferred embodiment of the invention, and is not intended to represent the only form in which the present invention may be constructed or utilized. The description sets forth the functions of the invention in connection with the illustrated embodiment. It is to be understood, however, that the same or equivalent functions and may be accomplished by different embodiments that are also intended to be encompassed within the scope of the invention. It is further understood that the use of relational terms such as first and second, top and bottom, left and right, and the like are used solely to distinguish one from another entity without necessarily requiring or implying any actual such relationship or order between such entities.

Figure 1C:
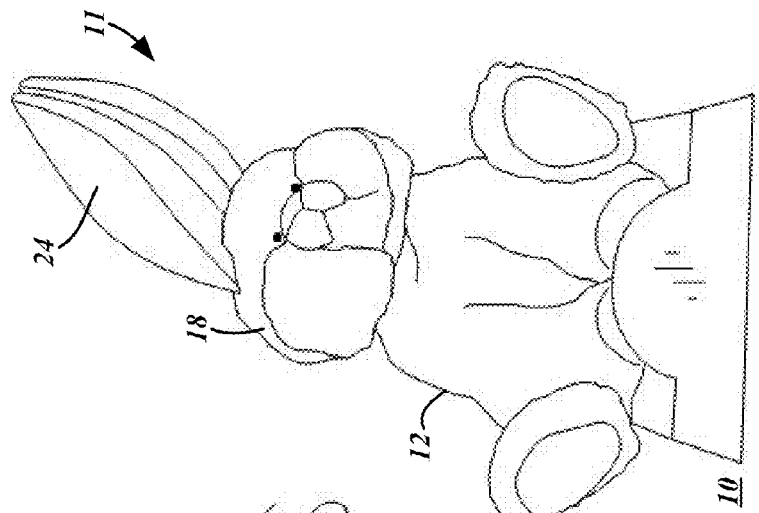
FIGS. 1A-C illustrate an exemplary embodiment of an interactive device in various states.
Figure 1B:
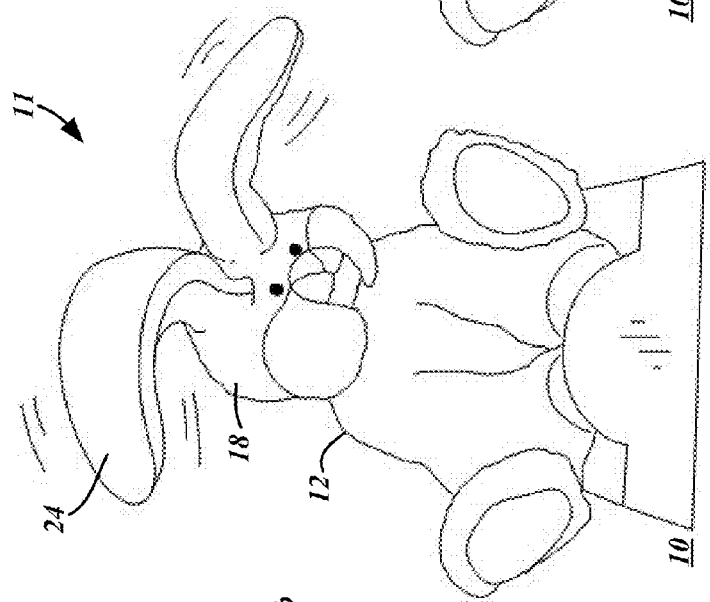
Figure 1A:
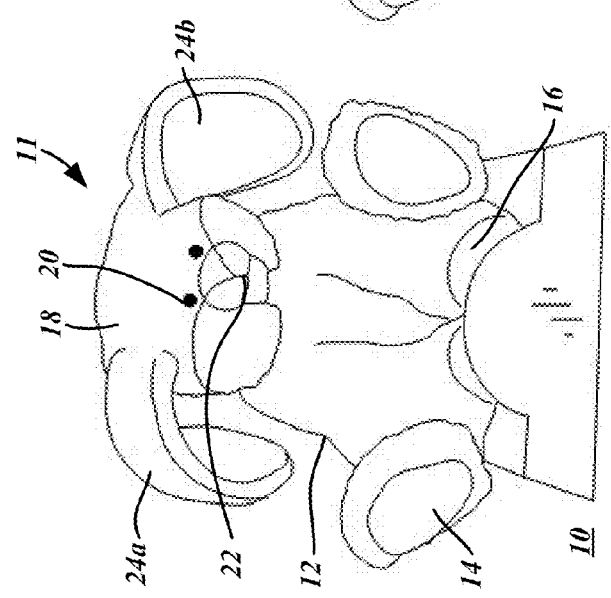

With reference to FIG. 1A, one exemplary embodiment of an interactive device 10 is an anthropomorphized rabbit figure 11 having a body section 12, a pair of legs 14, a pair of arms 16, and a head 18. In further detail, the head 18 includes a pair of eyes 20, a mouth 22 and a pair of ears 24. Where appropriate, each of the ears 24 will be referenced individually as right ear 24a and left ear 24b, and collectively as ears 24. As will be appreciated, the doll figure 11 may portray humans, other animals besides rabbits such as dogs, cats, birds and the like, or any other character real or imagined. It will also be appreciated that the foregoing features of the doll figure 11 are presented by way of example only, and not of limitation.

It is contemplated that the various features of the doll figure 11 are animated, i.e., movable, and have appropriate underlying support elements and joint structures coupling the same to the body section 12 along with actuators to move those features. For example, as shown in FIGS. 1B and 1C, the head 18 is capable of pivoting about the body section 12, and the ears 24 are capable of rotating or "flapping" about the head 18. In further detail, FIG. 1A shows the ears 24 in a resting position, FIG. 1B shows the ears 24 in an intermediate position, and FIG. 1C shows the ears 24 in an extended position. As will be described in further detail below, the movement of the ears 24 between the resting position, the intermediate position, and the extended position simulate a clapping action being performed by the doll figure 11. Similarly, the head 18 has a resting position as shown in FIG. 1A, an intermediate position as shown in FIG. 1B, and an extended position as shown in FIG. 1C. Those having ordinary skill in the art will recognize that the movement of the features of the doll figure 11 are not limited to the head 18 and the ears 24, and any other features may also be movable to simulate various actions being performed by the doll figure 11.

Figure 2:
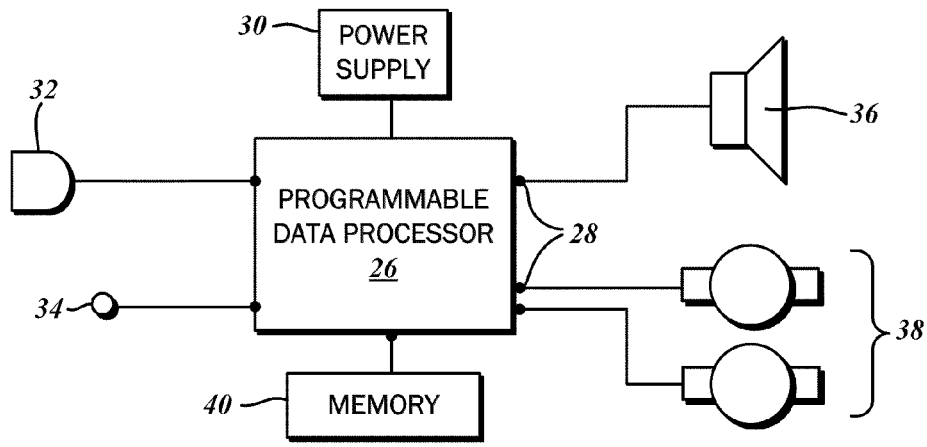
FIG. 2 is a functional block diagram of the interactive toy in accordance with one embodiment of the present invention, whereupon a method for interactive amusement may be implemented.

The block diagram of FIG. 2 best illustrates the functional components of the interactive device 10. A programmable data processor 26 is central to the interactive device 10, and is configured to execute a series of preprogrammed instructions that generates certain outputs based upon provided inputs. Specifically, the executed instructions are understood to be steps in a method for interactive amusement according to one embodiment of the present invention. The programmable data processor 26 is understood to have an arithmetic logic unit, various registers, an instruction decoder, and a control unit, as is typical of data processing devices. An internal random access memory may also be included. By way of example, the programmable data processor 26 is 16-bit digital signal processing (DSP) integrated circuit. One commercially available option is the eSL or eAM Series IC from Elan Microelectronics Corporation of Hsinchu, Taiwan, though any other suitable IC devices may be readily substituted without departing from the scope of the present invention.

The programmable data processor 26 has a plurality of general-purpose input/output ports 28 to which a number of peripheral devices are connected, as will be described below. The programmable data processor 26 is powered by a power supply 30, which is understood to comprise a battery and conventional regulator circuitry well known in the art.

According to one embodiment, among the input devices connected to the programmable data processor 26 are a piezoelectric transducer 32, and control switches 34. With respect to output devices, the programmable data processor 26 is also connected to a speaker 36 and mechanical actuators or electric motors 38.

According to one embodiment of the present invention, the piezoelectric transducer 32 and the speaker 36 are embedded within the doll figure 11. As is typical for dolls that depict animals and other characters that appeal to children, the doll figure 11 may be covered with a thick fabric material. Therefore, the respective diaphragms of the piezoelectric transducer 32 and the speaker 36 are disposed in substantial proximity to its exterior so that input sounds can be properly detected and output sounds can be properly heard without any muffling effects.

The control switches 34 are similarly embedded within the doll figure 11 but are also disposed in proximity to its exterior surface for ready access to the same. As will be described in further detail below, the control switches 34 may be power switches and mode-changing switches. Along these lines, the power supply 30 is also embedded within the doll figure 11, with access covers to the batteries being disposed on the exterior surface of the same.

As indicated above and shown in FIGS. 1A-1C, the head 18 and the ears 24 of the doll figure 11 are movable, and the electric motors 38 are understood to be mechanically coupled thereto. Specifically, the actuation element of the electric motors 38, that is, its rotating shaft, is coupled to the movable elements of the doll figure 11. Conventional gearing techniques well known by those having ordinary skill in the art may be employed therefor. In the block diagram of FIG. 2, the pair of the electric motors 38 corresponds to the head 18 and the ears 24. Based on the output signals generated by the programmable data processor 26, the ears 24 can be selectively moved. It is also contemplated that the electric motors 38 be coupled to other movable features of the doll figure 11, including the legs 14 and the arms 16.

In addition to the visual stimuli provided by the animation of the various features of the doll figure 11, it is also contemplated that the interactive device 10 provides aural stimulation. The programmable data processor 26 is understood to have sound synthesizing functionality, that is, the functionality of generating an analog signal in the sound frequency range based upon a discrete-time representation of the sound signal. These sound signals may be representative of spoken dialogue or a musical soundtrack.

Figure 3A:
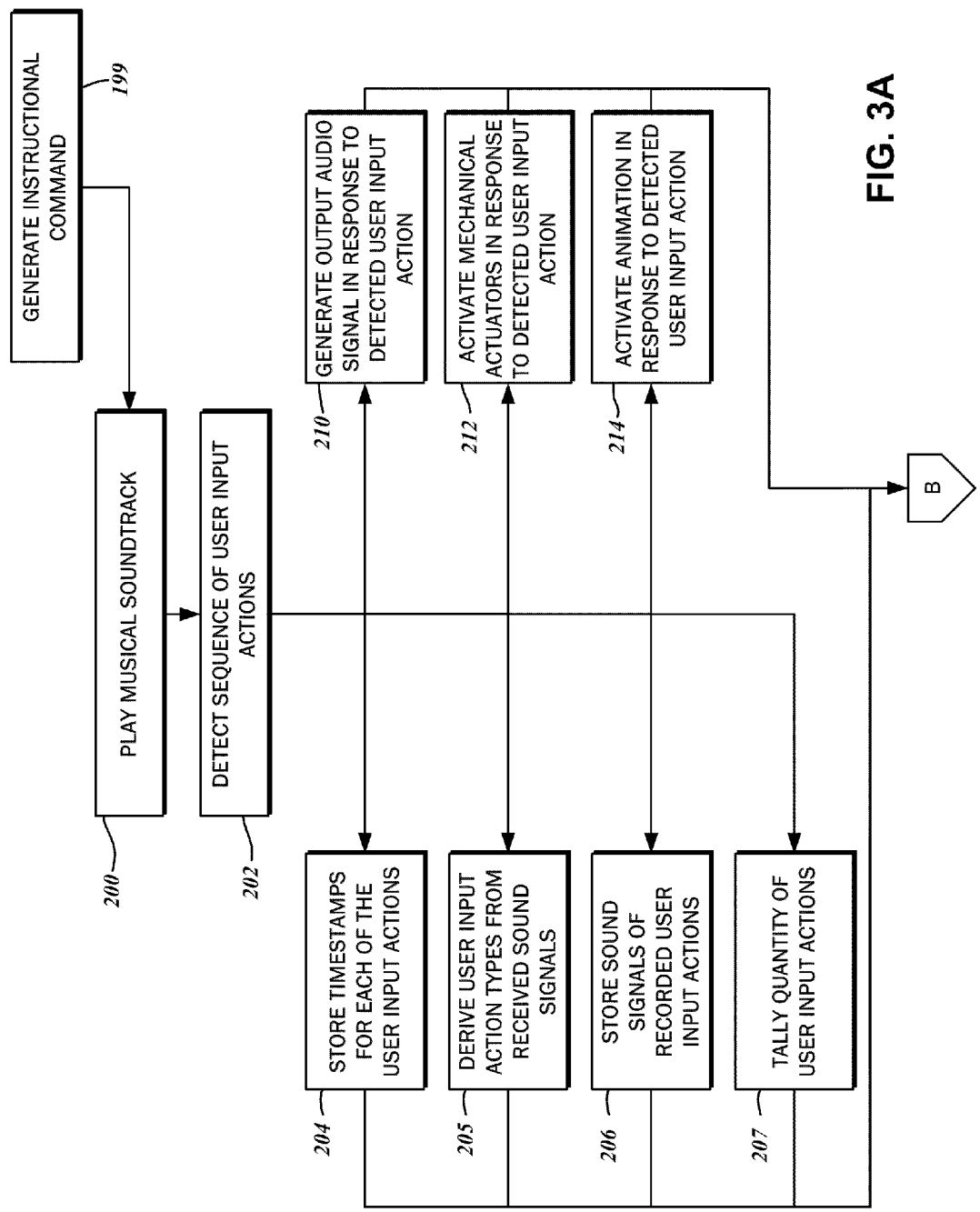
FIG. 3 is a flowchart illustrating the method for interactive amusement.
Figure 3B:
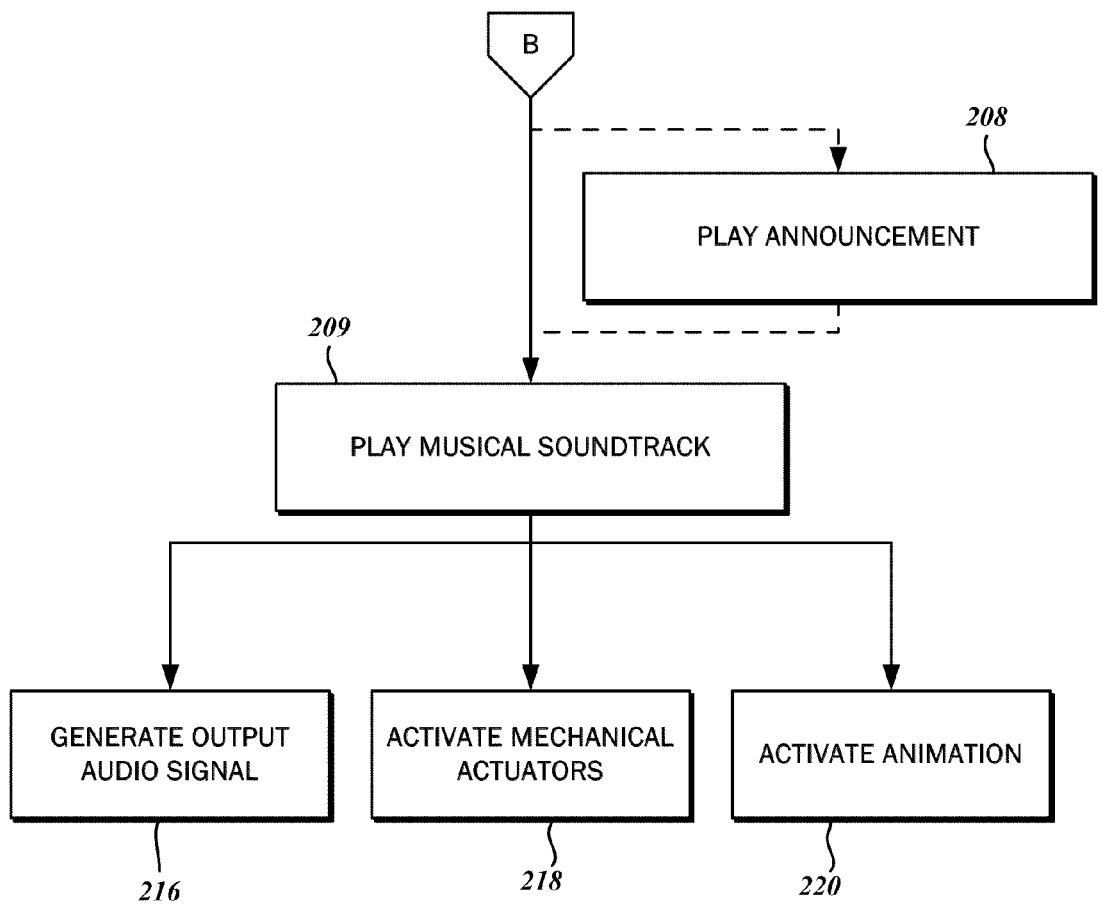

Having set forth the basic components of the interactive device 10, the functional interrelations will now be considered. One embodiment of the present invention contemplates a method for interactive amusement that may be implemented with the interactive device 10. With reference to the flowchart of FIG. 3, the method begins with a step 200 of playing a first musical soundtrack with or without moving any of the movable features of the doll figure 11. It is contemplated that step 200 occurs in a first game iteration that in some embodiments corresponds to a learning mode.

As shown in the block diagram of FIG. 2, the interactive device 10 includes an external memory module 40, in which a digital representation of the soundtrack, as well as output sounds, may be stored. Although any suitable memory module may be used, the external memory module 40 in one embodiment of the present invention is a read-write capable flash memory device. One commercially available external memory module 40 is the MX25L3205D device from Macronix International Co., Ltd. of Hsinchu, Taiwan. The particular external memory module 40 is understood to have a 4 megabyte, 8 megabyte 16 megabyte or 32 megabyte capacity. In some embodiments, it is contemplated that the soundtrack and the output sounds may be stored in a memory internal to the programmable data processor 26. The eSL or eAM IC mentioned above, for example, is understood to have 1 megabyte of internal memory.

In playing back the first soundtrack stored in the external memory module 40, the data is first retrieved from the same by the programmable data processor 26, and then an analog audio signal is generated with the sound synthesizer. This audio signal is then output through the speaker 36.

Prior to playing the first musical soundtrack, however, there may be an optional prefatory step 199 of generating an audible instructional command. This instructional command may describe in a user-friendly manner the general format of the preferred input sequence. Further details pertaining to the method of interactive amusement will be subsequently described, but may be generally described in the following exemplary instructional command: "Hello! I feel like singing! That's great! You can help me out by clapping your hands while I'm singing! Here goes!" Another exemplary instructional command is as follows: "I sure could use your help with the dance moves! Just clap when my ears should flap! Here goes!" It will be appreciated that numerous variations in the phrasing of the instructional command are possible, and so the foregoing examples are not intended to be limiting. The vocalization of the instructional command may also be varied, and may be accompanied by a musical score. The audio signal of the instructional command is digitally stored in the memory module 40 and retrieved for playback.

While the first musical soundtrack is playing in the first game iteration, a sequence of user input actions is received and detected according to step 202. More particularly, the user provides some form of an audio input that marks an instant in time relative to, or as synchronized with, the soundtrack that is simultaneously being played back. In some embodiments, the audio input is generated by the user external to the interactive device 10, or produced by the user outside the physical boundaries/confinements of the interactive device 10, for example, without touching the interactive device 10. Thus, the present invention contemplates an amusement device capable of receiving a sound input via the piezoelectric transducer 32 while at the same time producing a sound output via the loudspeaker 36. As will be described further below, additional simultaneous inputs from a microphone are also contemplated.

By way of example only, the user claps his or her hands to generate a short, high-frequency sound that is characteristic of such a handclap. Any other types of sonic input such as those produced by percussion instruments, clappers, drums, and so forth may also be provided. This sound is understood to have a level sufficient to trigger the piezoelectric transducer 32, which generates a corresponding analog electrical signal to an input of the programmable data processor 26. The piezoelectric transducer 32, which is also known in the art as a piezo buzzer or a piezo ceramic disc or plate, effectively excludes any lower frequency sounds of the musical soundtrack. In order to distinguish more reliably between the soundtrack and the user input action, the piezoelectric transducer 32 may be isolated, that is, housed in separate compartments, from the loudspeaker 36. Alternatively, the piezoelectric transducer 32 may be disposed in a location anticipated to be closer to the source of the user input than that of the loudspeakers. At or prior to initiating the playback of the musical soundtrack during the learning mode, the piezoelectric transducer 32 is activated. When the musical soundtrack finishes playing, the programmable data processor 26 may stop accepting further inputs from the piezoelectric transducer 32, or deactivate it altogether.

It will be appreciated that the piezoelectric transducer 32 is presented by way of example only, and any other modalities for the detection of the user input actions may be readily substituted. For example, a conventional wide dynamic range microphone may be utilized in conjunction with high pass filter circuits such that only the high frequency clap sounds are detected. Instead of incorporating additional circuitry, however, the raw analog signal as recorded by such a conventional microphone may be input to the programmable data processor 26. The analog signal may be converted to a discrete-time representation by an analog-to-digital converter of the programmable data processor 26, and various signal processing algorithms well known in the art may be applied to extract a signal of the clapping sounds. Although the present disclosure describes various features of the interactive device 10 in relation to the functionality of the piezoelectric transducer 32, it is understood that such features are adaptable to the alternative modalities for detecting the user input actions.

Figure 4:
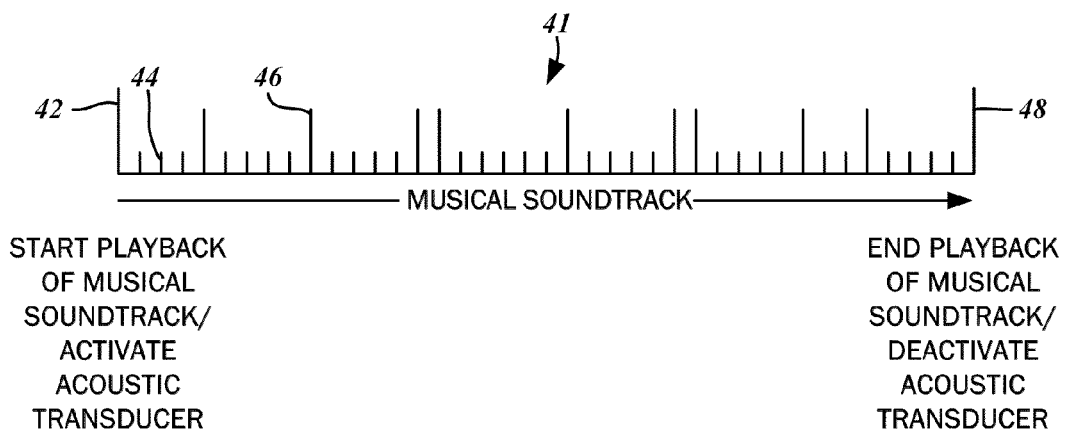
FIG. 4 is a plot illustrating an exemplary signal of user input actions generated by an acoustic transducer.

With reference to the plot of FIG. 4, a condensed representation of a user input signal 41 that corresponds to the clapping sound inputs is shown. The signal 41 is defined by a starting point 42 at which the musical soundtrack begins playing and the piezoelectric transducer 32 is activated. Each small tick mark 44 represents an equal time interval of the musical soundtrack, and larger tick marks 46 represent the instant in time when the clapping sound was detected. The signal 41 is also defined by an ending point 48 at which the musical soundtrack ends playing and the piezoelectric transducer 32 is deactivated.

The small tick marks 44 are understood to have a corresponding timestamp associated therewith. Considering that each of the large tick marks 46 overlap with one of the small tick marks 44, the timestamp is also associated with each moment a clapping sound was detected, and each handclap is linked to a particular playback position of the musical soundtrack. Referring again to the flowchart of FIG. 3, step 204 includes storing into memory these timestamps for when the user input actions were detected, and step 207 includes tallying the number of user input actions detected. To ensure real-time write speeds, the timestamps may be stored in the local random access memory of the programmable data processor 26.

The programmable data processor 26 includes a timer module that utilizes an external clock signal oscillating at a predefined frequency. The timer module is understood to generate a time value when queried. The timer may be reset to zero at the starting point 42, and the time value may be provided in seconds, milliseconds, or other standard measure of time which are then stored as the timestamp.

Alternatively, where the programmable data processor 26 does not include a timer, the instruction cycle count value may be utilized to derive the timestamp. Given a consistent operating frequency of the programmable data processor 26, it is understood that the time interval between each cycle is similarly consistent. A unit measure of time may thus be derived from multiple instruction cycles, so the instruction cycle count value is therefore suitable as a reliable timestamp. In order to ascertain the elapsed time between each of the user input actions, the instruction cycle count value may be incremented at each instruction cycle, with the particular value at the time of detecting the user input action being stored as the timestamp.

For reasons that will be set forth in greater detail below, in addition to storing the timestamps of each of the detected user input actions, the method may also include a step 205 of deriving user input action types from the received sound signals and storing that as well. In this regard, the analog signal from a microphone 33 may be input to the programmable data processor 26, where it is analyzed for certain characteristics with the aforementioned signal processing algorithms. As previously noted, one basic embodiment contemplates the reception of user input actions solely with the piezoelectric transducer 32, and it will be appreciated that the addition of the microphone 33 represents a further refinement that allows for more execution alternatives from different user inputs. Amongst the characteristics derived from the analog signal include the amplitude, frequency, and duration of each sound signal, the different combination of which may be variously categorized into the user input action types.

More sophisticated analyses of the user input action types built upon the basic amplitude, frequency, quantity and duration characteristics are also contemplated, such as rhythm, tempo, tone, beat, and counts. For example, a hand clap may be distinguished from a whistle, a drum beat, and any other type of sound. Additionally, it is also contemplated that a sequence of user input actions may be matched to a predefined pattern as being representative of a characteristic. By way of example, such a predefined pattern may include a sequence of one or more progressively quieter hand claps, or a sequence of claps that alternate variously from quiet to loud. It will be appreciated that any pattern of user input actions varying in the above characteristics could be predefined for recognition upon receipt.

In addition to deriving the user input action types, the sound signal may also be recorded for future playback, as will be explained below. Again, the analog signal from the microphone 33 is input to the programmable data processor 26, where it is converted to a digital representation, and stored in memory. Since each detected instance of the user input actions may have different sounds, all of the sound signals are separately recorded and stored.

After storing the timestamp for the last of the detected user input actions, the learning mode concludes. In a subsequent, second iteration that corresponds to a playback mode in some embodiments, the method may continue with an optional step 208 of playing an announcement and a step 209 of playing a second musical soundtrack. As noted previously, this includes retrieving the digital representation of the same from the memory module 40 and generating an analog signal that is output to the speaker 36. In some embodiments, the first musical soundtrack that is played back in the first iteration is the same as the second musical soundtrack that is played back in the second iteration. However, it is also envisioned that the first musical soundtrack can be different from the second musical soundtrack. In such cases, the first and second musical soundtracks are understood to have a similar tempo and other such characteristics so that the outputs generated according to the detected user input actions remain synchronized.

While playing the second musical soundtrack, and in coordination therewith, the method continues with a step 216 of generating an output audio signal based upon the stored timestamps and/or user input actions, such as the number and/or patterns of user input actions detected. More particularly, at each time interval where there was detected a user input action or handclap, an output audio signal is generated. It is contemplated that such output audio signals are synchronized with the playback of the musical soundtrack, that is, the sequence of handclaps performed during the learning mode is repeated identically, in the playback mode with the same pattern and timing relative to the musical soundtrack. In other words, the output audio signal is synchronous with the user input signal 41. It is also contemplated that the output audio signals generated can also vary depending on the number and/or pattern of user input actions detected.

As indicated above, a tally is kept of the total number of user input actions detected per step 207. In the step 216 of generating the output audio signal, specific outputs such as spoken or sung announcements relating to the value of the tally may be produced. For example, where fifty claps were detected, the output may indicate that there were fifty claps, and has burned a certain number of calories based upon those fifty claps. The mechanical movement and animations generated may also be based upon this tally. Although a specific type of output has been presented, it is by way of example only, and any other suitable output may be generated based upon this data.

It is also contemplated that a related step 210 of generating the output audio signal may occur during the first game iteration, as the user input actions are detected. Thus, the output audio signal may be generated concurrently with the user input action during an instant response mode. The instant response mode is thus understood to be concurrent with the first game iteration or the learning mode. Accordingly, further reference to the instant response mode is understood to be included in any references to the first iteration. In some embodiments where this instant response mode is activated, the method need not necessarily continue to the playback mode, though it may. However, to the extent that the learning mode is activated without activating the instant response mode, the method continues to the playback mode.

It is further contemplated that, in some embodiments where the playback mode is activated (or during the second game iteration), it is possible to activate the instant response mode concurrently with the playback mode as well.

In one embodiment, the output audio signals are pre-recorded sounds. Different pre-recorded sounds may be randomly generated for each of the timestamps/user input actions. The same pre-recorded sound may be generated for each of the timestamps/user input actions. It will be appreciated that any type of pre-recorded sounds may be utilized. Additionally, different pre-recorded sounds may be played corresponding to different user input action sequences detected during the learning mode. As indicated above, the number of claps, the pattern of the claps, and so forth may be designated for a specific kind of output.

In a different embodiment, the output audio signals are the sound signals of the user input actions recorded in step 206. The sound signals corresponding to each of the timestamps or user input actions are individually recorded, so the output audio signals are understood to be generated in sequence from such individual recordings.

Along with generating an output audio signal, in a step 218, mechanical actuators or electric motors 38 are activated based upon the stored timestamps and/or user input actions detected. At each time interval in which a user input action was detected, the electric motors 38 are activated. This is effective to move, for example, the ears 24 of the doll figure 11 in an apparent clapping action. The activation of the electric motors 38 is synchronized with the output audio signals, so visually and aurally the doll figure 11 claps to the musical soundtrack in the playback mode exactly as performed by the user in the learning mode. It is expressly contemplated, however, that the electric motors 38 need not be activated for every timestamp or detected instance of user input actions. Depending on the number and/or pattern of the user input actions detected, a different corresponding movement may be produced, that is, a different sequence of motor activations may be generated. Furthermore, although the output audio signals are typically played back in combination with the movement of the doll figure 11, it is also envisioned that these outputs may be separate, that is, the movement of the ears may occur without the output audio signals, and vice versa.

As with the earlier described step of generating the output audio signal, the step 218 of activating the mechanical actuators in the second iteration has a corresponding step 212 that may occur during the first iteration or instant response mode. In this regard, the activation may likewise occur in response to a detected user input action. Upon concluding the learning mode and/or the instant response mode, the method may continue to the playback mode or second iteration.

Figures 5, 5A:
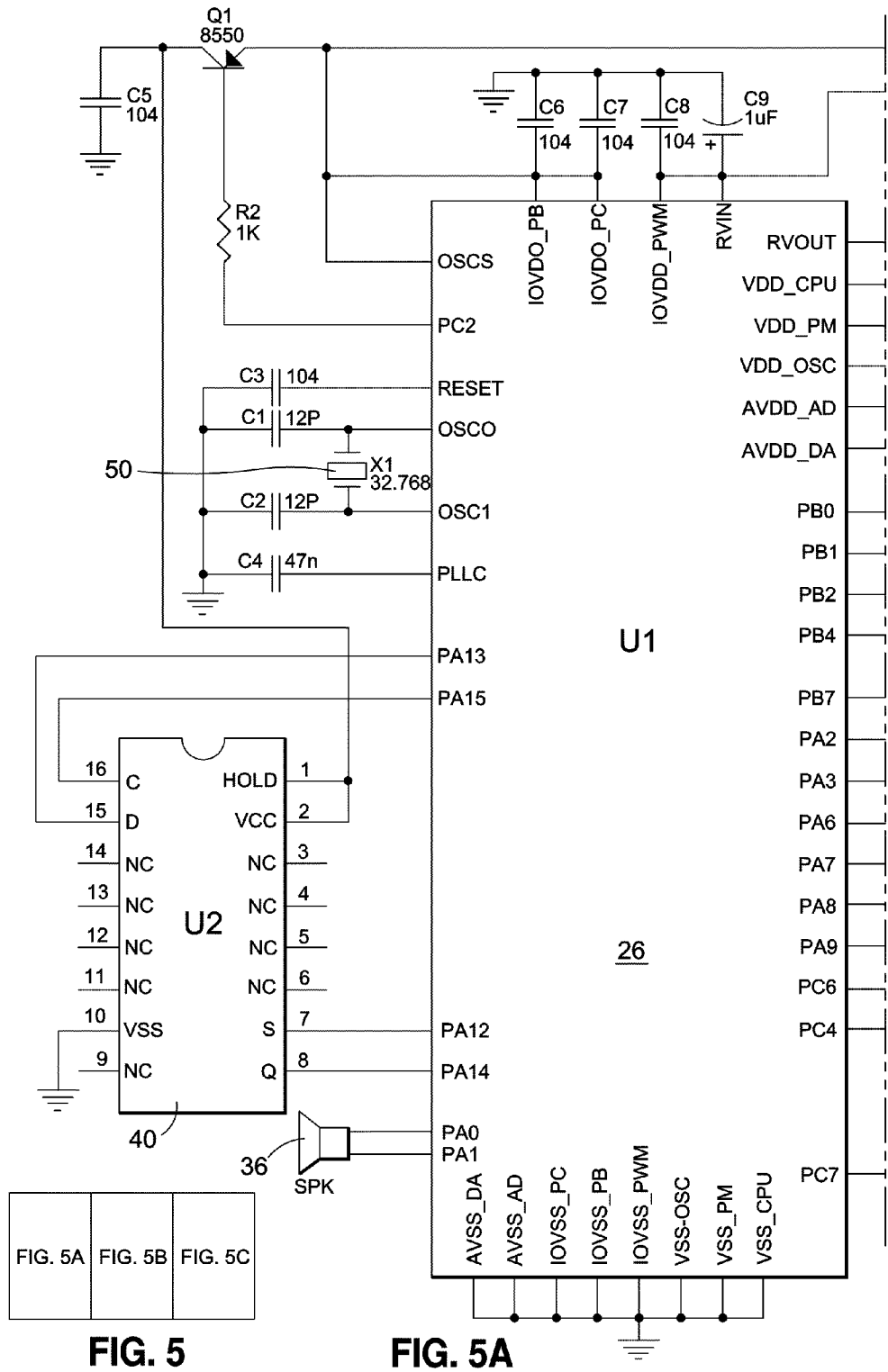
FIG. 5 is a schematic diagram illustrating the embedded systems components of the interactive device including a central processor, a memory device, a pair of mechanical actuators, and acoustic transducers.
Figure 5B:
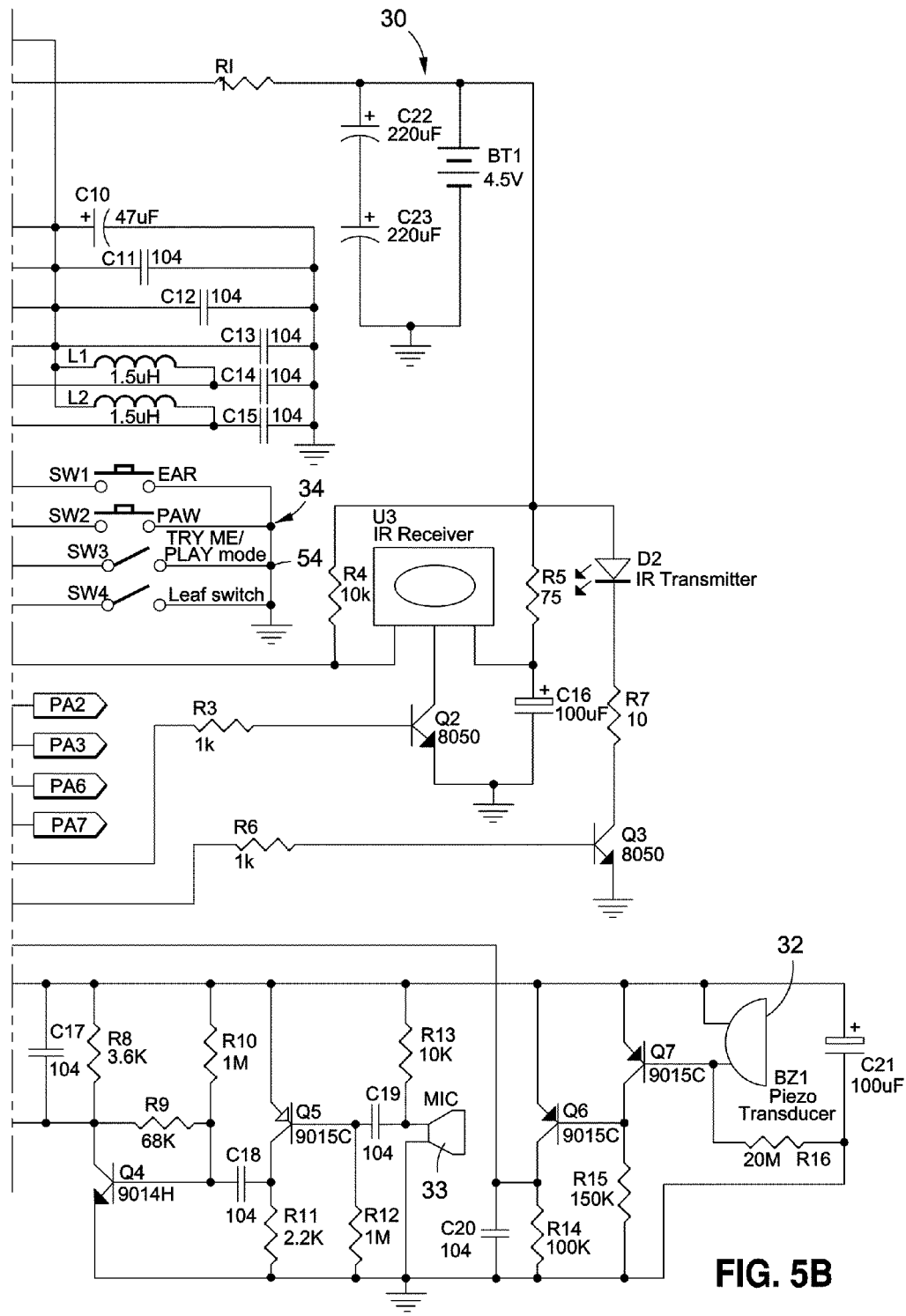
Figure 5C:
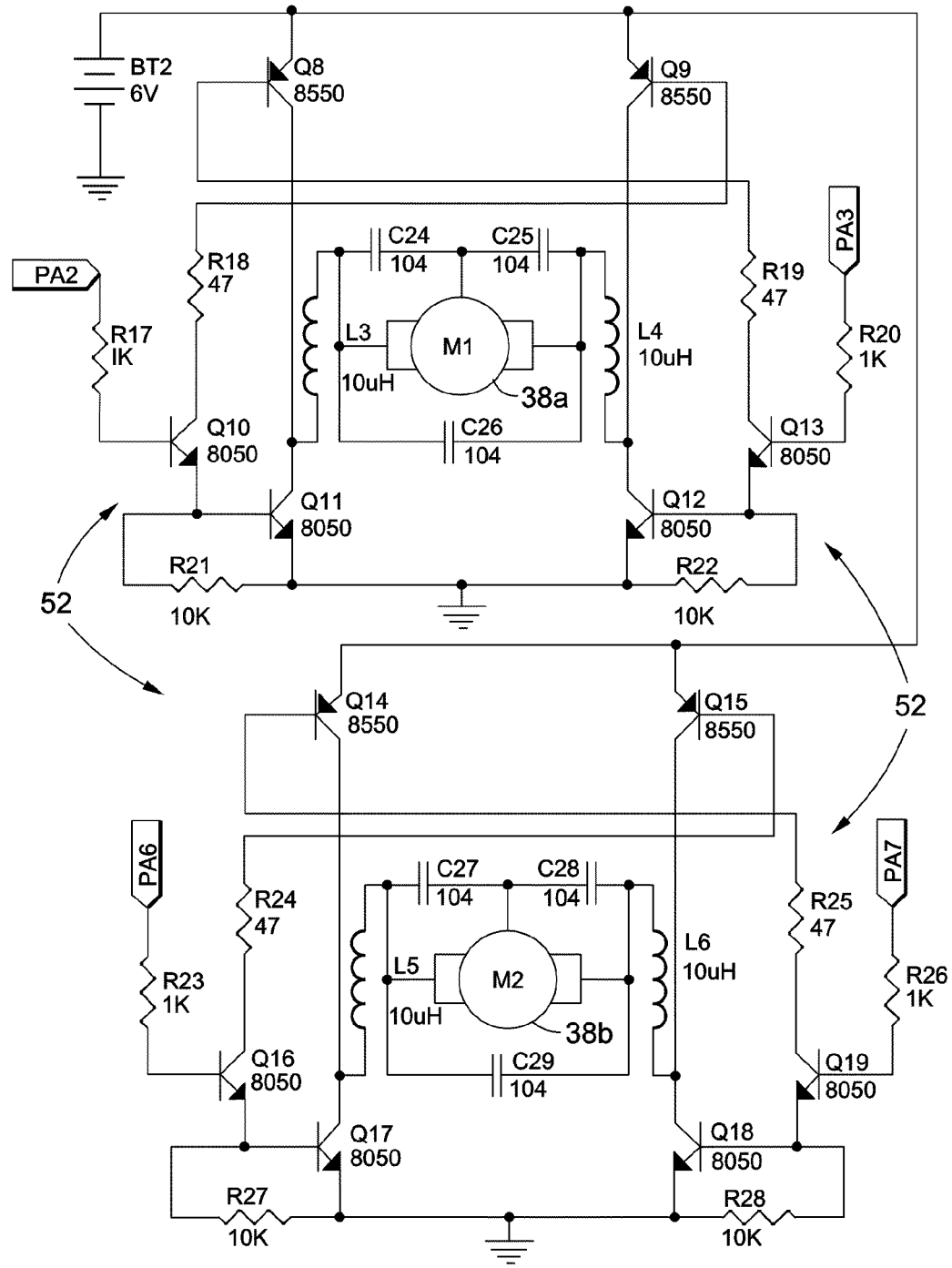

The schematic diagram of FIG. 5 provides a more specific illustration of an exemplary circuit utilized in one embodiment of the interactive device 10. As indicated above, the programmable data processor 26 includes general-purpose input/output ports 28, labeled as PA0-PA15, PB0-PB15, and PC0-PC7. Although the specific programmable data processor 26 includes two 16-bit wide ports (Port A and Port B) and an 8-bit wide port (Port C), not all pins are utilized, so are not depicted. The clock frequency of the programmable data processor 26 is provided by an oscillator crystal 50 connected to the OSC0 and OSC1 ports. Various positive and negative power supply pins are connected to the power supply 30, and chip control pins are connected in accordance with conventional practices well known in the art.

Pins PA2 and PA3 are connected to a first motor 38*a*, while pins PA6 and PA7 are connected to a second motor 38*b*. The first motor 38*a* may be mechanically coupled to the ears 24, and the second motor 38*b* may be mechanically coupled to the head 18. It will be appreciated that the programmable data processor 26 generally does not output sufficient power to drive the electric motors 38 nor is it sufficiently isolated. Accordingly, driver circuitry 52 serves as an interface between the electric motors 38 and the programmable data processor 26, to amplify the signal power and reject reverse voltage spikes. Those having ordinary skill in the art will recognize the particular signals that are necessary to drive the electric motors 38. Along these lines, there may be sensors that monitor the operation of the motors 38, the output from which may be fed back to the programmable data processor 26 for precise control. The specific implementation of the motors 38 described herein are not intended to be limiting, and any other configuration may be substituted.

Pins PA0 and PA1 are connected to the speaker 36, and pins PC4 and PC7 are each connected to the piezoelectric transducer 32 and the microphone 33. Furthermore, Pins PA12-PA15 are connected to the memory module 40. In this configuration, data transfers and addressing are performed serially, though it will be appreciated that parallel data transfers and addressing are possible with alternative configurations known in the field.

Figure 6:
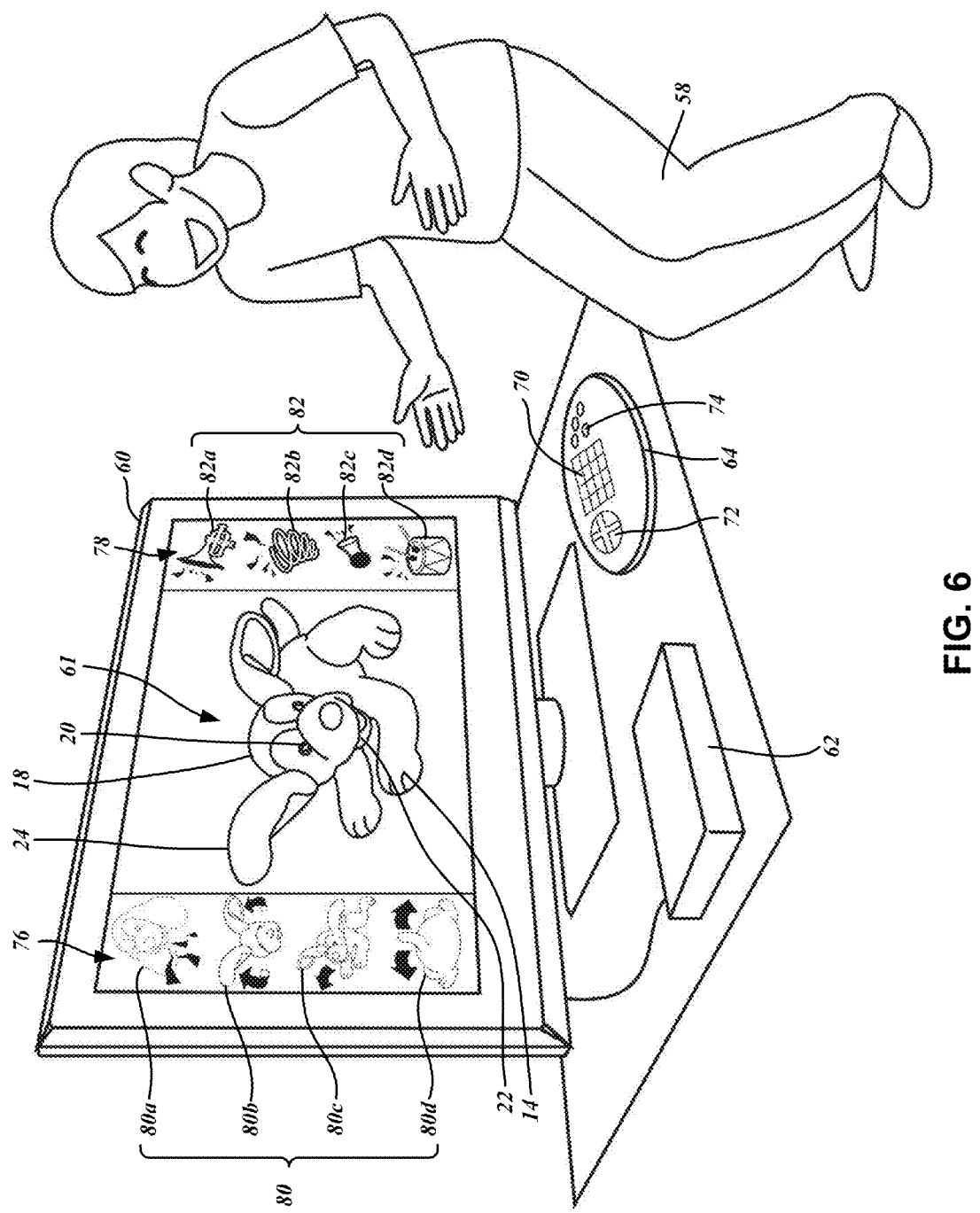
FIG. 6 illustrates an alternative embodiment of an interactive device in use.

With reference to the illustration of FIG. 6, another embodiment of the present invention contemplates an amusement device that is independent of the doll figure 11. As will be described in greater detail, the various components of such alternative embodiment find correspondence to the features of the amusement device 10 noted above. It will be recognized that the method for interactive amusement can be similarly implemented thereon. A player 58 views and interacts with a graphical display device 60 capable of displaying animations of a character 61 and generating the appropriate output sounds as previously described. Similar to the doll figure 11, the character 61 may portray humans and animals such as rabbits, dogs, cats, birds, and so forth, and include features that can be animated including the legs 14, the head 18, the eyes 20, the mouth 22, and the ears 24. Generally, such animated features are understood to correspond to the movable physical features of the doll figure 11. In this regard, the method for interactive amusement includes a step 220 of activating the animations based on the timestamps and/or user input actions. Depending on the number and/or pattern of the user input actions detected, a different corresponding animation may be produced, that is, a different sequence of animations may be generated. Furthermore, although the output audio signals are typically played back in combination with the animation of the amusement device 10, it is also envisioned that these outputs may be separate, that is, the animation may occur without the output audio signals, and vice versa.

Again, as with the earlier described step of generating the output audio signal and activating the mechanical actuators, the step 220 of activating the animations in the second iteration has a corresponding step 214 that may occur during the first iteration or instant response mode. The activation is understood to occur in response to a detected user input action. Where the instant response mode is activated, the method may be concluded, but alternatively, the method may continue to the playback mode or the second game iteration. In other embodiments as envisioned and discussed above, it is possible to activate the instant response mode concurrently with the playback mode or second game iteration.

The graphical display device 60 may be a conventional television set having well-known interfaces to connect to a console device 62 that generates the audio and graphical outputs. According to one embodiment, the console device 62 is a commercially available video game system that may be loaded with a variety of third-party game software, such as the PlayStation from Sony Computer Entertainment, Inc. of Tokyo, Japan, or the Xbox from Microsoft Corp. of Redmond, Wash. Alternatively, the console device 62 may be a dedicated video game console with the appropriate dedicated software to generate the audio and graphical outputs being preloaded thereon. These dedicated video game consoles are also referred to in the art as "plug N' play" devices.

Figure 7B:
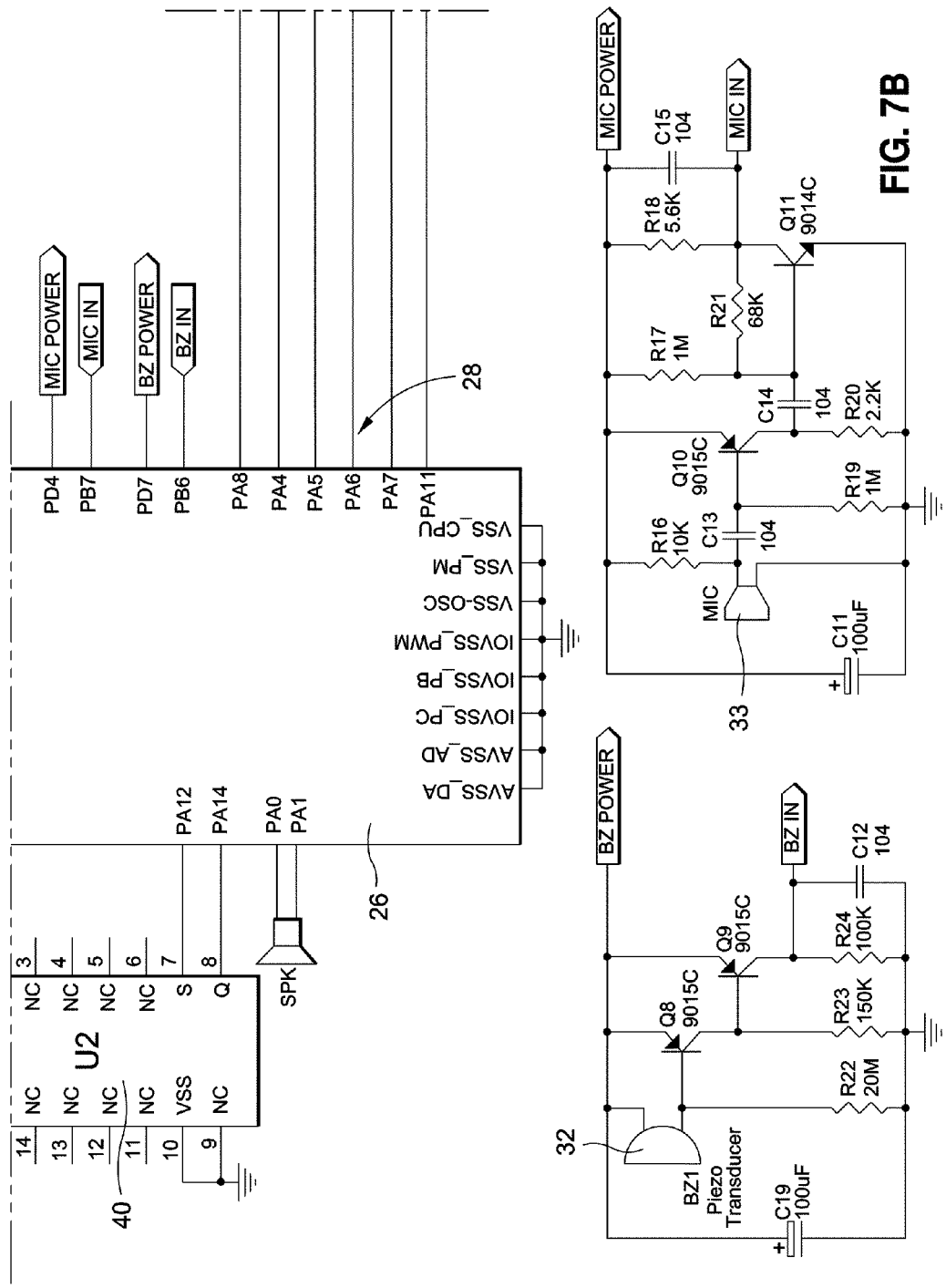
FIG. 7 is a schematic diagram of the alternative embodiment of the interactive device including a display driver and a wireless transceiver.
Figure 7C:
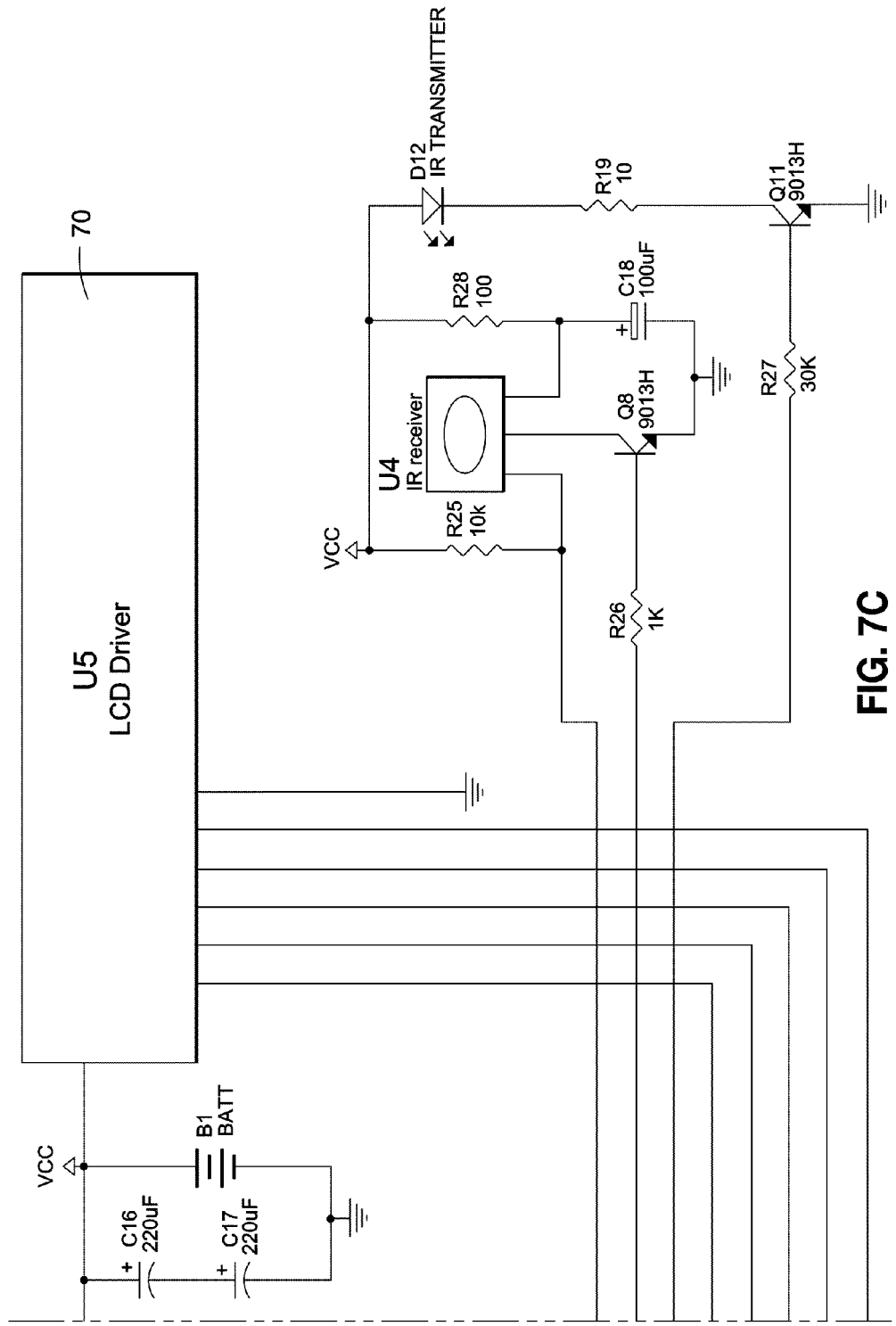
Figure 7D:
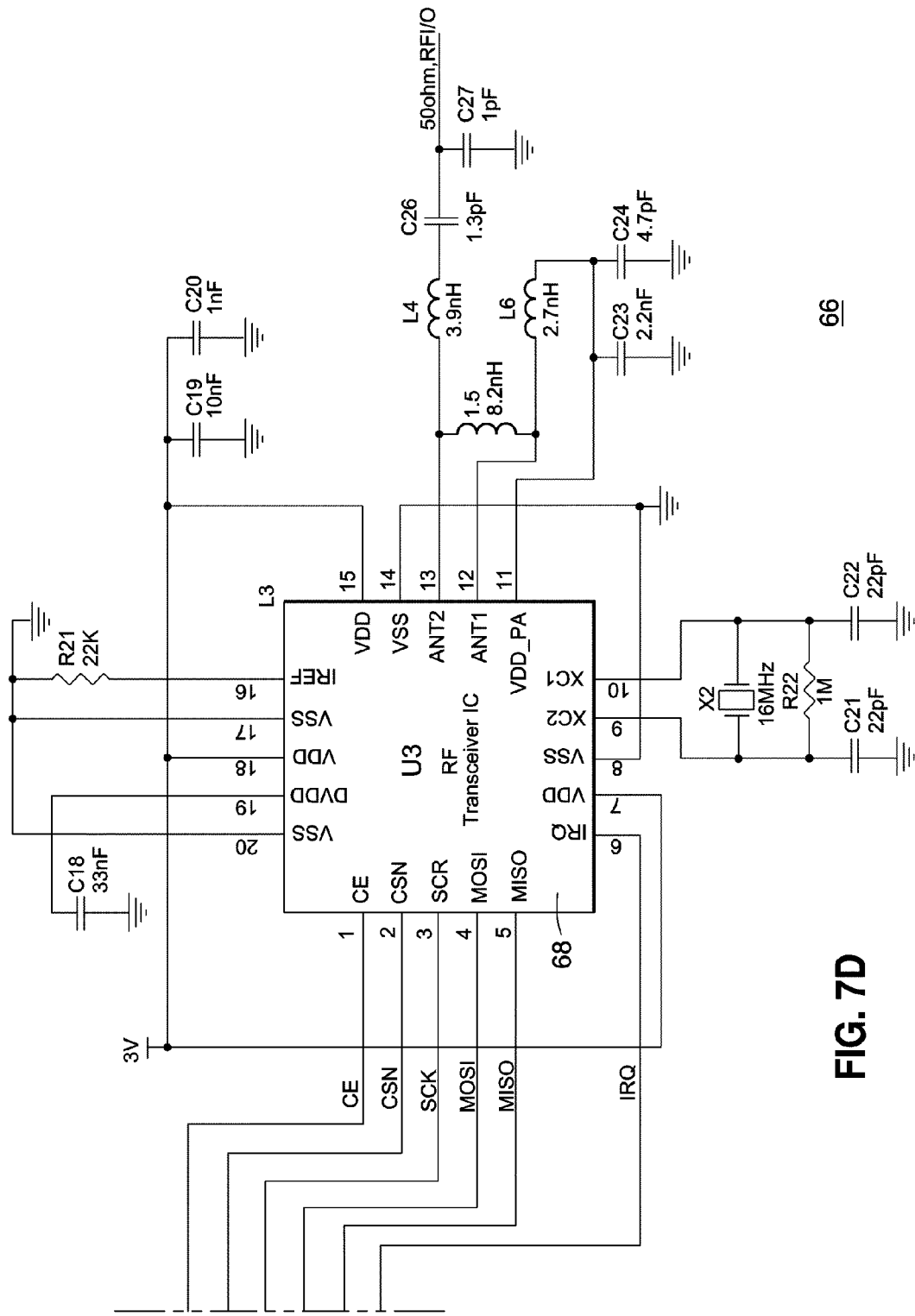

In accordance with one embodiment of the present invention, the console device 62 communicates with a remote controller 64 to perform some functionalities of the amusement device. With reference to the schematic diagram of FIG. 7, the remote controller 64 may include a device circuit 66 with the programmable data processor 26, the piezoelectric transducer 32, the microphone 33, and the memory module 40. As with the first embodiment, the amusement device begins with playing a default animation sequence and musical soundtrack and detecting a sequence of user input actions with the piezoelectric transducer 32 and the microphone 33 included in the remote controller 64. In coordination with the received user input actions, accompanying animations and/or images may be generated on the display device 60. The embedded programmable data processor 26 then stores the timestamps for each of the user input actions and derives the user input action types.

During the learning mode, the musical soundtrack and other instructional commands are output through the speaker associated with the display device 60. In this embodiment, the remote controller 64 need not include a loudspeaker. It will be recognized that the isolation of the piezoelectric transducer 32 and microphone 33 in the remote controller 64 from any sound output source in this way is beneficial for reducing interference from the musical soundtrack during the learning mode or instant response mode. Further filtering of the recorded sound signal is possible with the digital signal processing algorithms on the programmable data processor 26. Alternatively, the loudspeaker may be included in the remote controller 64 for playing back the musical soundtrack and/or the output sound signals along with the loudspeaker associated with the display device 60.

In one implementation, the timestamps and associated user input action types are sent to the console device 62. Furthermore, a tally of the total number of user input actions detected may be calculated for further use, as described above. With this input, the software on the console device 62 generates the graphics for the animations and the sound outputs. The tally of detected user input actions may be displayed, spoken, sung, or otherwise output on the display device 60. The circuit 66 includes a radio frequency (RF) transceiver integrated circuit 68 that is connected to the programmable data processor 26 via its general purpose input/output ports 28 for receiving and transmitting data. It will be appreciated that any suitable wireless transceiver standard or spectrum may be utilized, such as the 2.4 GHz band, Wireless USB, Bluetooth, or ZigBee. Over this wireless communications link, the timestamps, the user input action types, and as applicable, the recorded sound signals of the user input actions are transmitted. The console device 62 may include another RF transceiver integrated circuit and another programmable data processing device to effectuate data communications with its counterparts in the remote controller 64. It will be appreciated by those having ordinary skill in the art, however, that a wired link may be utilized. When a wired link is utilized, a single programmable data processing device shared between the console device 62 and the remote controller 64, may be needed.

Instead of or in conjunction with the television set, the animations may be displayed on an on-board display device 70, which may be a conventional liquid crystal display (LCD) device. The animations are generated by the programmable data processor 26 based upon the timestamps and the user input action types. The on-board display device 70 may be a grayscale device capable, a color device, or a monochrome device in which individual display elements may be either on or off.

As noted above, it is contemplated that various animations are generated on the display device 60 and/or the on-board display device 70. During the learning mode or instant response mode, the frames of the animation may be advanced in synchrony with the received user input actions, or one animated sequence may be displayed at each detected user input action. Where the animation is linked to the user input actions in these ways, the display device 60 and/or the on-board display device 70 may output a default animation different from those specific animations associated with user input actions as the soundtrack is replayed. For example, where the depicted character 61 exhibits substantial movement when the user input action is detected or a timestamp so indicates, the default animation may involve just a minor movement of the character 61. Furthermore, it is contemplated that such animations are generated on the display device 60 and/or the on-board display device 70 during the playback mode, which are likewise coordinated with the received user input actions as recorded in the timestamps.

Figure 8:
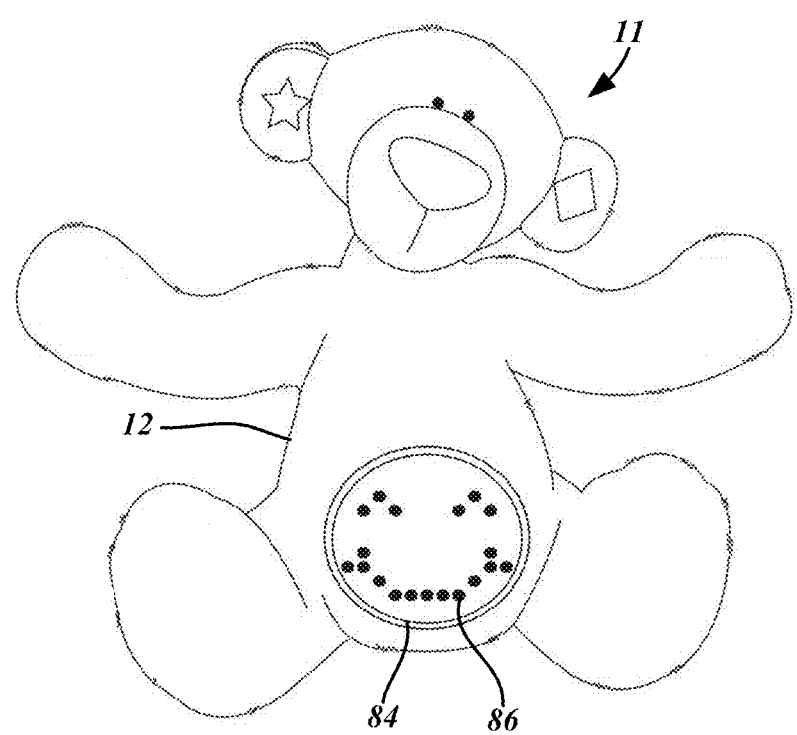
FIG. 8 illustrates another exemplary embodiment of the interactive device, including an on-board display device.
Figure 8C:
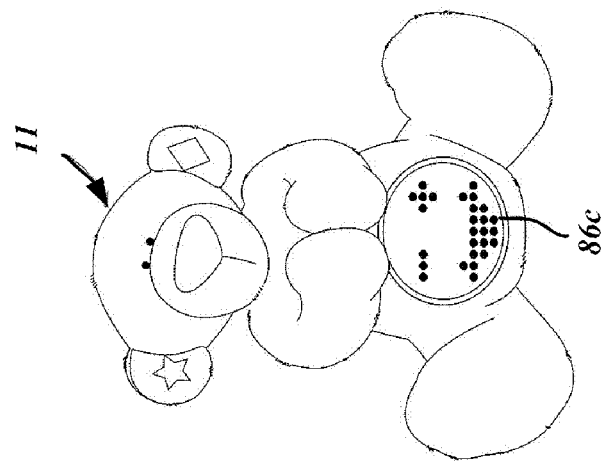
FIGS. 8A-8C show the interactive device with the on-board display device in various states.
Figure 8B:
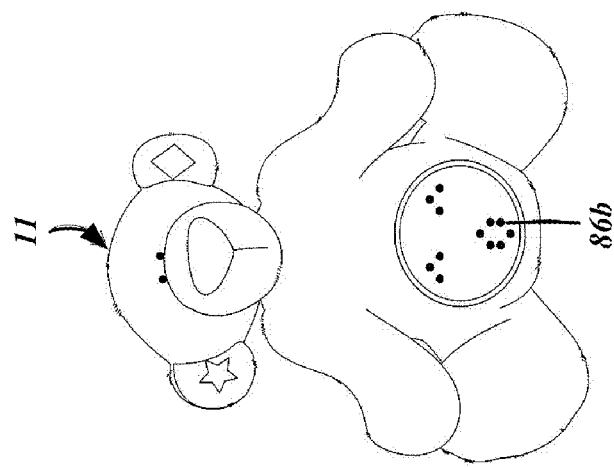
Figure 8A:
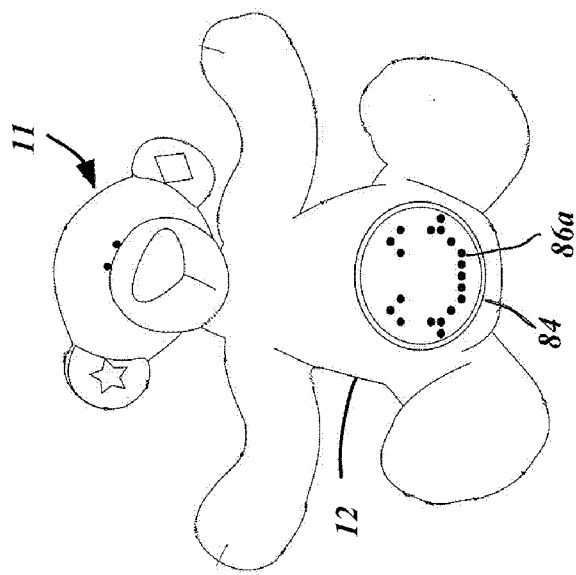

The display of animations on on-board display devices is not limited to those embodiments with the console device 62. As best illustrated in FIG. 8, another example of the doll figure 11 includes a Light Emitting Diode (LED) array display 84 that includes a plurality of individually addressable LED elements 86 that are arranged in columns and rows. By selectively activating a combination of the LED elements 86, various images can be shown. Further, by sequentially activating a combination of the LED elements 86, animations can be shown. FIGS. 8A-8C further illustrate a combination of the LED elements 86 being illuminated in different patterns, in conjunction with actuation of the electric motors and thus the movable appendages of the doll figure 11.

FIGS. 9A-9D depict one possible animation sequence utilizing the LED array display 84, though any other sequence such as a moving equalizer, beating drum, and so forth may be readily substituted. The animation speed, that is, the delay between changing from one frame to another, may be varied. As previously noted, one contemplated embodiment outputs the animation on the LED array display 84 during the playback mode. In this case, the display of each frame or session is based upon the recorded timestamps much like the output audio signals and the movement of the various features of the doll figure 11 by the electric motors. Another contemplated embodiment outputs the animation on the LED array display 84 during the learning mode or instant response mode as the user input actions are received. When utilizing the microphone 33 and variations in user input action types are discernible (e.g., progressively louder hand-claps, etc. as mentioned above), the animations can be differed to correspond to such variations.

In the exemplary embodiment shown, the LED array display 84 is mounted to the body section 12 of the doll figure 11. It will be appreciated, however, that the LED array display may be of any size or configuration, and may be mounted in other locations on the doll figure 11. Alternatively, there may be a single LED having single or multiple color output capabilities that flash in different colors and patterns according to user input action types. As indicated above, the doll figure 11 may take a variety of different forms, such as a robot, a vehicle, etc.

Along with a direction control pad 72 and pushbuttons 74, the on-board display device 70 may include input capabilities, i.e., a touch-sensitive panel may be overlaid. With the use of such a touch sensitive panel, the direction control pad 72 and the pushbuttons 74 may be eliminated. Those having ordinary skill in the art will recognize that numerous types of touch-sensitive panels are available. Amongst the most popular is the capacitive touchpad that detects the position of a finger of a touch-sensitive area by measuring the capacitance variation between each trace of the sensor. The touch inputs are converted to finger position/movement data to represent cursor movement and/or button presses. The additional inputs are contemplated for the selection of additional options in the playback mode. Referring again to the illustration of FIG. 6, the interface displayed on the graphical display device 60 includes a left column 76 and a right column 78, which include icons 80, 82, respectively. The icons 80, 82 are positioned to correspond to the relative segregated regions on the touch-sensitive on-board display device 70. Thus, the on-board display device 70 may also output reduced-size representations of the icons 80, 82. It is also possible, however, to eliminate the on-board display device 70, and only the touch-sensitive panel may be included on the remote controller 64. Thus, no graphical output will be generated on the remote controller 64.

By way of example only and not of limitation, the selection of one of the icons 80 in the left column 76 is understood to select a specific animation of a feature of the character 61 that is activated according to the timestamps. For example, selection of a first left column icon 80*a* activates the animation of the mouth 22, while a selection of a second left column icon 80*b* activates the animation of the ears 24. Selection of a third left column icon 80*c* activates the animation of the legs 14, and selection of a fourth left column icon 80*d* activates the animation of a tail. Upon selection of any of the icons 80, visual feedback is provided by placing an emphasis thereon, such as by, for example, highlights.

The selection of one of the icons 82 in right column 78, on the other hand, is understood to select a particular output sound signal that is generated according to the timestamps. Selection of a first right column icon 82*a* is understood to generate a trumpet sound, and selection of a second right column icon 82*b* generates a "spring" or "boing" type sound. Furthermore, selection of a third right column icon 82*c* generates a bike horn sound, while selection a fourth column icon 82*d* generates a drum sound. In some embodiments, different output channels may be assigned to a particular sound, with each of the output channels being connected to the loudspeaker. Accordingly, the various analog sound signals generated by the programmable data processor 26 may be mixed. However, it is also contemplated that the various output sound signals, along with the musical soundtrack, may be digitally mixed according to well-known DSP algorithms prior to conversion by a digital-to-analog converter (DAC) and output to the loudspeaker.

It is expressly contemplated that other types of animations and sounds may be provided, and the user's selection thereof may be accomplished by navigating the interface with the direction control pad 72 and the input buttons 74, for example. One selection made during the learning mode may be made applicable to all of the user input actions during the playback mode. For example, when the second left column icon 80*b* and the first right column icon 82*a* is selected at the outset of the learning mode, then during the playback mode, only the ears 24 are animated and the trumpet sound is generated for each user input action. However, it is also possible to accept different icon selections throughout the learning mode, such that the particular animation or sound selected through the icons 80, 82 are varied during the playback mode according to the sequence of selections.

In addition to implementing the above-described steps in the method for interactive amusement, one embodiment of the interactive device 10 is contemplated to have a peripheral execution flow, as will be described in further detail. These behaviors are presented by way of example only and not of limitation, and any other suitable behaviors may be incorporated without departing from the present invention. With reference to the flowchart of FIG. 10, a typical sequence begins with powering on the interactive device 10 in step 300. Immediately, a sleep mode is entered in step 302 until further input is provided. In a decision branch 304, a button press is detected. As shown in the schematic diagram of FIG. 5, pin PB2 of the programmable data processor 26 is connected to a switch 54, and is understood to be the button that is pressed in the decision branch 304. Until the switch 54 is activated, however, the interactive device 10 remains in the sleep mode. After decision branch 304, a demonstration mode is entered in step 306. Here, an opening dialog may be played back, along with the musical soundtrack. The opening dialog may introduce the portrayed character to the user, and describe what is being demonstrated. It will be appreciated that different versions of the opening dialog may be pre-recorded and stored in the memory module 40, and selected at random. Then, the learning mode is entered in step 308, and traverses the steps described above and as shown in the flowchart of FIG. 3.

After completing the playback of the musical soundtrack in the learning mode, the piezoelectric transducer 32 is deactivated in step 310. In decision branch 312, it is determined whether any user input actions were detected, that is, whether any timestamps were stored into memory. If there was nothing detected, a first register (nominally designated Register_0) is incremented. Thereafter, in decision branch 316, it is determined whether the first register has a value greater than 2. If not, then the learning mode is entered again in step 308, repeating the steps associated therewith. Otherwise, the first register is cleared in step 318, and returns to the sleep mode in step 302. In general, the foregoing logic dictates that if the learning mode is attempted twice without any user input actions, the interactive device 10 is deactivated into the sleep mode.

Figure 10:
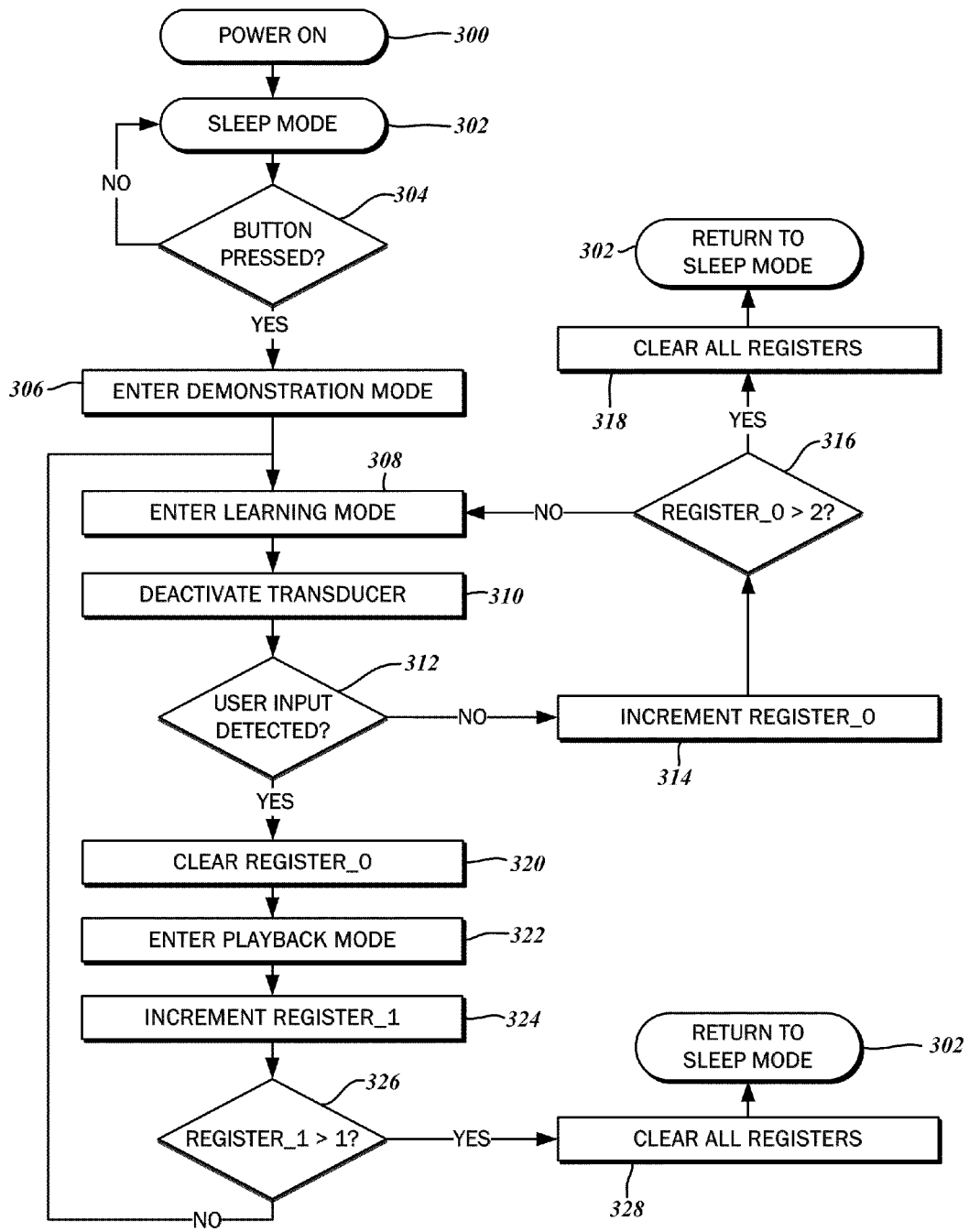
FIG. 10 is a detailed flowchart illustrating one exemplary software application being executed by the central processor to implement the interactive device according to an embodiment of the present invention.

Returning to the flowchart of FIG. 10, if there has been any user input actions detected per decision branch 312, the method continues with a step 320 of clearing the first register. As noted above, the first register tracks the number of times the learning mode is entered, and deactivates the interactive device 10 to the sleep mode 302 if there is no activity. Having detected activity, the method continues with entering the playback mode in step 322, and traverses through the steps described above and as shown in the flowchart of FIG. 3. Then, after the playback of musical soundtrack completes, a second register (nominally designated Register_1) is incremented in step 324. In decision branch 326, if it is determined that the second register has a value greater than 1, then execution continues to a step 328 where the first and second registers are reset, and returns to the sleep mode in step 302. Thus, if the interactive device 10 has traversed through the learning and playback modes more than once, it is put into the sleep mode. After the first traversal, however, execution returns to entering the learning mode per step 308.

Each of the aforementioned embodiments generally segregates those functions performed during the learning mode and those functions performed during the playback mode. The present invention also contemplates, however, embodiments in which the reception of the user input actions, the playback of the musical soundtrack, and the playback of the output audio signals occurs at in real-time without particular association with a learning mode or a playback mode. With such embodiments, it is likewise contemplated that the sound input from the piezoelectric transducer 32 is received at substantially the same time as the various sound outputs to the loudspeaker are generated. It will be recognized by those having ordinary skill in the art that a miniscule delay may be introduced between the receipt of the sound input, analysis thereof, selecting the appropriate output, and generating that output.

In one exemplary embodiment, a story-telling Santa Claus may recite a Christmas story. While the spoken story is generated by the loudspeaker, the piezoelectric transducer 32 and the microphone 33 are activated and receptive to the user input actions. As the story is being told, it is possible for the user to alter the storyline by providing user input actions that vary according to pattern, amplitude, frequency, and so forth as described above. From the moment the user input action is detected the narration continues with an alternate story line. By way of example, when a portion of the story relating to Santa Claus rounding up reindeer on Christmas Eve is being narrated and the user inputs three claps, the narration will indicate three reindeer being rounded up. As a further example, when the portion of the story relating to Santa Clause boarding the sleigh and being ready to begin his trek, the user may input progressively louder hand claps to simulate the sleigh gaining speed for flight. Along with the narration, sound effects typically associated with take-offs can be output. The foregoing example is presented by way of example only, and those having ordinary skill in the art will be capable of envisioning alternative game play scenarios in which the reception of the user input actions are simultaneous with the playback of the output audio signals.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

What is claimed is:

1. A method for amusement on an interactive device including a data processing apparatus with one or more inputs and one or more outputs, the method comprising:

playing on the interactive device a first soundtrack continuously and uninterrupted in a first game iteration;

detecting a sequence of user input actions received at points along the playing of the first soundtrack during the first game iteration via one of the inputs of the data processing apparatus;

generating an output from one of the outputs of the data processing apparatus in response to the detection of at least one of the user input actions in the sequence of user input actions;

storing into a memory connected to the data processing apparatus timestamp markers corresponding to the points of each of the detected sequence of user input actions, each of the timestamp markers designating a time instant at which the respective user input action was detected relative to the first soundtrack and corresponding to one of a plurality of time intervals uniformly segmented over an entire length of the first soundtrack; and generating outputs from the one of the outputs of the data processing apparatus on at least one interval of the received sequence of user input actions as correspondingly designated by the recorded timestamp markers, the outputs being generated at substantially the same time instant relative to the playing of a second soundtrack during a second game iteration in which the outputs are generated at equivalent points along the playing of the second soundtrack as when the respective one of the user input actions was detected during the playing of the first soundtrack as correspondingly designated by the timestamp marker therefor.

2. The method of claim 1, further comprising:
activating on at least one interval of the received sequence of user input actions a mechanical actuator coupled to a movable element.

3. The method of claim 2, further comprising:
activating the mechanical actuator in response to the detection of one of the sequence of user input actions.

4. The method of claim 2, further comprising:
tallying the number of user input actions detected as a count value;
wherein the activation of the mechanical actuator is based at least in part on the count value.

5. The method of claim 2, further comprising:
measuring a number of user input actions detected as a count value;
wherein the activation of the mechanical actuator is based at least in part on the count value.

6. The method of claim 1, further comprising:
generating on a display device an animation coordinated with the received sequence of user input actions.

7. The method of claim 6 further comprising:
generating the animation on the display device in response to the detection of one of the sequence of user input actions.

8. The method of claim 6, further comprising:
tallying the number of user input actions detected as a count value;
wherein the animation is based at least in part on the count value.

9. The method of claim 6, further comprising:
measuring a number of user input actions detected as a count value;
wherein the animation is based at least in part on the count value.

10. The method of claim 1, wherein playing the respective one of the first and second soundtrack includes:
retrieving digital representations of the respective one of the first and second soundtracks from the memory; and
generating an audio signal of the respective one of the first and second soundtracks from the digital representation.

11. The method of claim 1, wherein the first soundtrack and the second soundtrack are different.

12. The method of claim 1, wherein the first soundtrack and the second soundtrack are the same.

13. The method of claim 1, further comprising:
tallying the number of user input actions detected as a count value;
wherein the outputs are based at least in part on the count value.

14. The method of claim 1, wherein the outputs are an audio signal.

15. The method of claim 1, wherein the outputs are a visual animation sequence.

16. The method of claim 1, wherein the outputs are a mechanical actuator activation signal.

17. The method of claim 1, further comprising:
measuring a number of user input actions detected as a count value;
wherein the outputs are is based at least in part on the count value.

* * * * *